Dec. 4, 1923.
H. S. MURRAY
TOASTER
Filed July 1, 1922
1,476,171
2 Sheets-Sheet 1
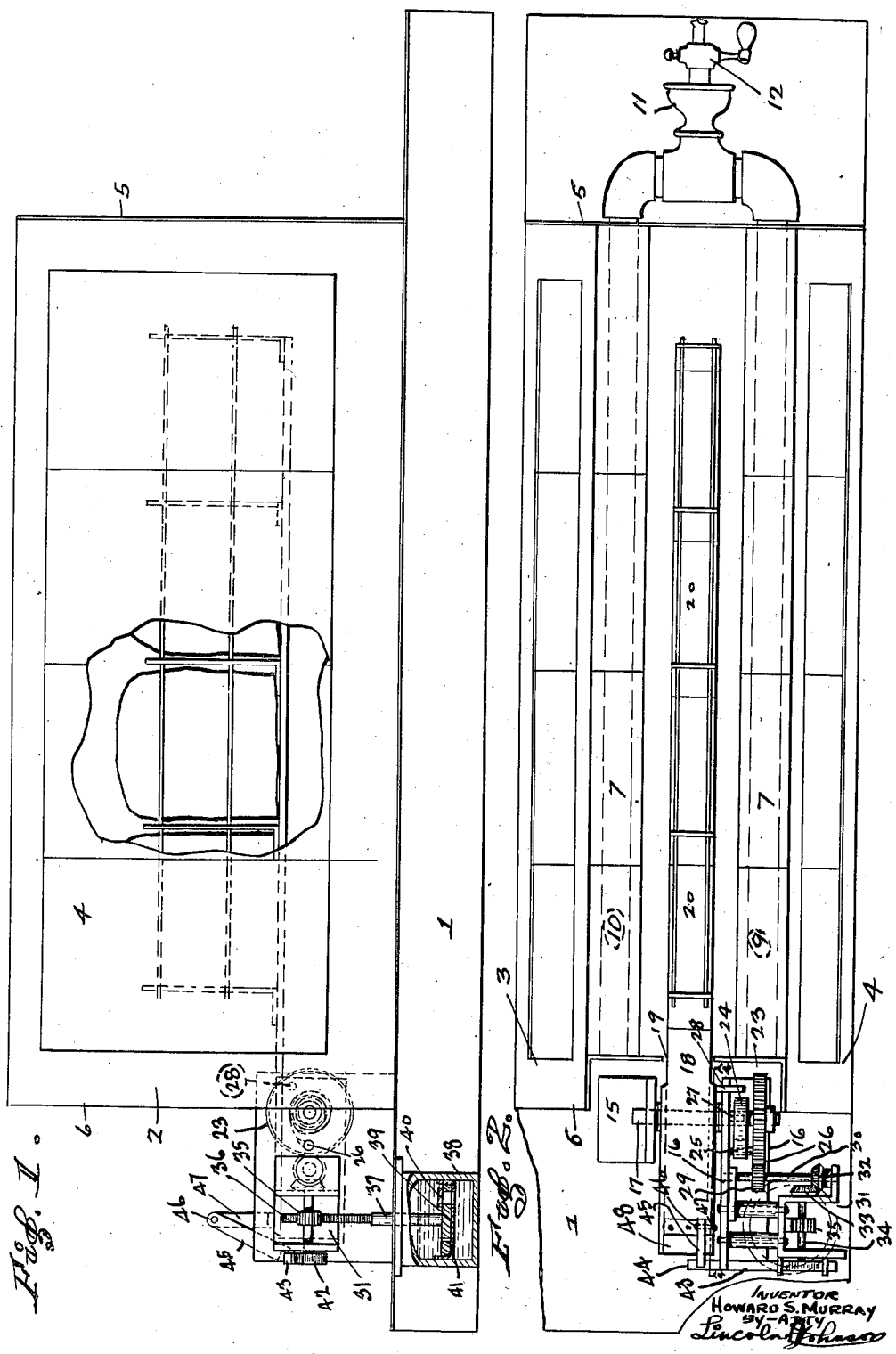

Dec. 4, 1923.
H. S. MURRAY
TOASTER
Filed July 1, 1922
1,476,171
2 Sheets-Sheet 2
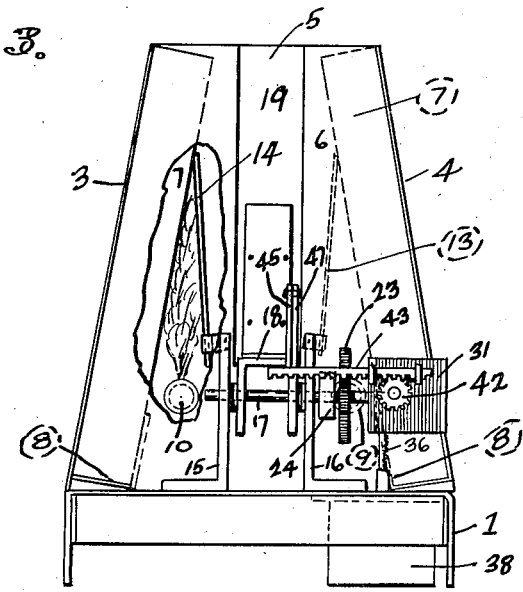
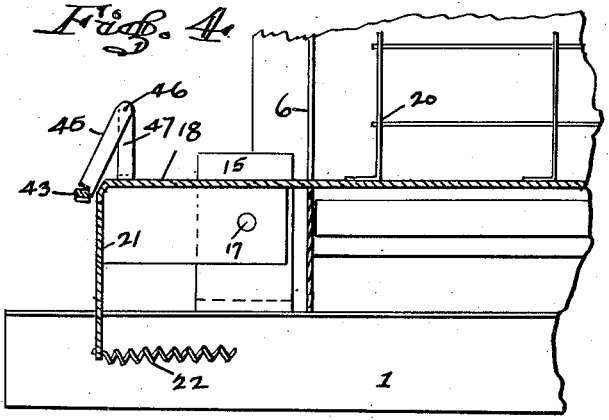
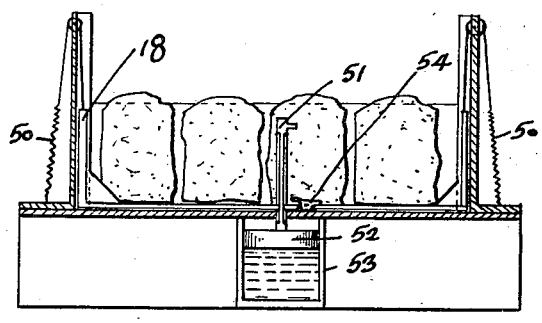
INVENTOR
HOWARD S. MURRAY
BY ATTORNEY
Lincoln Johnson

Patented Dec. 4, 1923.

1,476,171

UNITED STATES PATENT OFFICE.

HOWARD S. MURRAY, OF SAN FRANCISCO, CALIFORNIA.

TOASTER.

Application filed July 1, 1922. Serial No. 572,321.

*To all whom it may concern:*

Be it known that I, HOWARD S. MURRAY, a citizen of the United States, and a resident of the city and county of San Francisco, State of California, have made a new and useful invention—to wit, Improvements in Toasters; and I do hereby declare the following to be a full, clear, concise, and exact description of the same.

This invention relates particularly to an improved mechanism for toasting slices of bread, buns and the like.

An object of the invention is to provide a heater that will toast bread on both sides simultaneously and after the elapse of a predetermined period of time, automatically remove the toasted bread from the heater.

A further object of the invention is to provide a device that will be superior in point of simplicity, inexpensiveness of construction, positiveness of operation and facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying two sheets of drawings,

Fig. 1 represents a side elevation of a toaster constructed in accordance with my invention and partly broken away to show the interior thereof.

Fig. 2 is a plan view of Fig. 1.

Fig. 3 is an end elevation of Fig. 1.

Fig. 4 is a vertical section taken through Fig. 1 on the line 4—4.

Fig. 5 is a modified form of construction.

In detail, the construction illustrated in the drawings comprises a base or supporting platform 1, suitably formed from sheet metal, or any other desirable material, and having a housing 2 mounted upon its upper surface. The housing 2 comprises slanted side walls 3 and 4 and end enclosing members 5 and 6, respectively. The side walls are either spot-welded, riveted or otherwise secured to the base 1, so that the respective parts are joined together in a rigid manner.

The interior faces of the side walls 3 and 4 are lined with a fire brick 7, such as silocele or other equivalent heat-resisting and non-conducting material, fixedly held in stationary position in the sockets or mountings 8 formed adjacent the base of each of the side walls 3 and 4. The upper surface of the platform 1 between the sides 3 and 4 is also provided with a layer of the heat-resisting material thereon. The side walls 3 and 4 are positioned on an angle of about seven degrees from the vertical, so that at the upper edge of each, the space between the same is constricted.

A gas heater comprised of the burners 9 and 10, supplied with gas through the mixing jet 11 from a control valve 12, is adapted to be positioned within and between the insulation covered walls 3 and 4 and to lie adjacent and parallel with each side wall. Foraminated or perforated grids 13 and 14, formed from iron, wire or screen or other material capable of effectively withstanding the destructive contact of flame and heat, are adapted to be arranged between the insulation covered walls 3 and 4. The grids are positioned at a slight angle from the vertical and extend partially over the burners 9 and 10. When the valve 12 is regulated to admit gas through the mixing jet 11 into the burners 9 and 10, to issue from the burner orifices and to be lighted, the flame therefrom passes upwardly into contact with the insulation walls 3 and 4, and into contact with the inner faces of the grids 13 and 14. The waste gases of combustion and the hot air pass through the grids 13 and 14 and upwardly through the constricted aperture provided between the upper edges of the side walls 3 and 4. The gas flame coming in contact with the grids 13 and 14 heats the same to incandescence so that heat is radiated therefrom.

Although I have shown and described the apparatus as provided with a gas burner, I do not wish to be understood as limiting my invention thereto inasmuch as it would be clearly within the purview of the invention to utilize an electrical heating filament in lieu thereof.

A pair of spaced standards or brackets 15 and 16 are secured to the base 1 adjacent the end of the housing 2, said brackets being drilled to provide a bearing for the shaft 17 adapted to be rotatably mounted therein. The bread rack 18 is adapted to be fixedly secured on the shaft 17, one end of said rack extending into the space between the burner grids 13 and 14 through a slot or opening 19, cut in the end wall 6 of the housing. The rack 18 on that portion lying within the housing 2 has a plurality of receptacles or pockets 20 formed therein, each of which is adapted to receive and hold a piece of bread, bun or the like. The underside of the opposite end of the bracket has a depending extension 21 thereon, extending below the plane of the surface of the base 1 and to the end of which a spring 22 is secured, the opposite end of said spring being held in a relatively stationary manner to the base 1. The spring 22 functions to swing the toast rack 18 on its shaft 17 into a substantially vertical position.

In order to keep the bread rack 18 between the heating grids 13 and 14, I have provided a latch and trip mechanism that will operate automatically through the radial swinging movement of the bread rack 18. A pinion is securely fixed on one end of the projecting shaft 17. A helically wound, flat clock spring 24 is arranged around said shaft between the pinion 23 and bracket 16, the outer end 25 of said spring being secured to a pin 26 projecting from one side of the pinion 23 and the opposite inner end of said spring being secured to a stationary projection 27 on the bracket 16. The spring 24 unwinds when the bread rack 18 lies in the horizontal position when placed within the housing 2 between the heating grids 13 and 14. When the bread rack is permitted to swing into a substantially vertical position, a projecting shoulder 28 on the rack 18 engages the movable end 25 of the spring fixed to the pinion 23 and partially rotates the said pinion.

In order that the spring 24 will unwind for a predetermined period of time, its speed is regulated by a governing mechanism consisting of a pinion 29 fixed on the shaft 30 supported in the bearing brackets 16 and 31 and meshing with the pinion 23. A bevel pinion 32 is secured to the shaft 30 which meshes with a companion bevel pinion 33 fixedly mounted on the shaft 34 rotatably journaled in the bracket 31. The shaft 34 is provided with a pinion 35 thereon, operatively meshing with gear rack 36 secured on the plunger shaft 37. The plunger shaft passes concentrically within a dash pot or cylinder 38 adapted to contain a fluid, said plunger having the end thereof secured to a piston 39 slidably guided within the said cylinder. The piston 39 is provided with a check valve 40, to permit a free movement of the piston in a downward direction, and with a restricted opening 41 therethrough to limit the rate of movement in the upward direction. By regulating the size of the opening 41, the rate of speed with which the piston 39 will move upwardly or downwardly may be thus controlled.

The end of the shaft 34 opposite that on which the bevel pinion 33 is secured has a pinion 42 thereon meshing with a gear rack 43, movable laterally in suitable slide bearings provided therefor in the brackets 16 and 31. The end 44 of the rack 43 is adapted to be moved into and from the path of movement of the end 48 of the bread rack 18 and to be operatively engaged by the latch arm 45 pivoted at 46 to the shoulder 47 on the bread rack 18. Assuming that the bread rack 18 be standing in a vertical position, the operator would place slices of bread within the pockets 20. Prior to placing the bread between the heating grids 13 and 14, the length of the toasting period would be regulated according to the amount of projection of the end 44 of the rack 43 into the path of movement of the latch 45 on the end of the said bread rack. The greater the distance that the end 44 of the rack 43 projects from the bracket 31 within the path of movement of the bread rack 18, the longer will be the period of time that the bread slices on the rack will be maintained in proximity with the heating grids. Regulating the placement of the rack 43 and length of projection of the end 44 thereof controls the period of time that the bread rack 18 will be maintained between the heating grids. The operator then grasps the exposed end 48 of the said bread rack to swing the bread receptacles into the housing 2 between the heating grids 13 and 14, which movement causes the latch 45 on the end thereof to engage the projecting end 44 of the rack 43. Simultaneously, the spring 24 commences to unwind, rotating the pinion 23, which through its connected gear train elevates the gear rack 36 and piston plunger 37. The upward movement of the plunger 37 moves the piston 39 vertically within the cylinder 38 and causes the fluid therein contained to be by-passed through the restricted opening 42 and to regulate the speed of unwinding of the spring 24. Movement of the same gear train causes the projecting end of the rack 43 to be withdrawn out of the path of movement of the bread rack 18 so as to disengage said end from the latch 45. Upon the disengagement of the latch 45 from the rack 43, the expanded spring 22 exerts a downward pull on the depending extension 21, swinging the bread rack 18 to a vertical position. This same movement causes the arm 28 on the bread rack 18 to engage the end 25 of the spring 24 and to wind the spring preparatory to another operation. During the short interval that the spring 24 is being rewound, and thereafter, the piston 39 drops within the cylinder 38 so that all parts are in readiness for further operation. Repeated experiments with this apparatus have proven that bread may be toasted on both sides in ten seconds' time and then automatically ejected from between the heat grids.

In the modification, shown in Fig. 5, the bread rack 18 is lifted vertically by springs 50 or counterweights secured to the opposite ends of said bread rack 18. The lower rail of the rack 18 passes through a slotted plunger shaft 51, slidably guided within the cylinder 53. Suitable check valves are provided on the cylinder mechanism to regulate and control the speed of the upward and downward movement of the plunger. A vertical lifting movement of the rack 18 lifts the plunger shaft 51 and moves the piston 52 upward within the cylinder 53. Downward movement of the rack 18 into engagement with the latch 54 holds the said rack within and between the heating grids, said downward movement being accomplished in a much shorter period of time than that in which the plunger shaft 51 drops within the cylinder 53. As the plunger shaft 51 reaches the bottom of its stroke, it disengages the latch 54 from the bread rack 18 and releases the bread rack 18, permitting it to be elevated vertically by the springs 50. This form of mechanism thus functions to produce the same results obtained with the preferred form previously described.

Having thus described this invention, what I claim and desire to secure by Letters Patent is:

1. A device such as described comprising spaced burners; a bread carrying rack adapted to be arranged between said burners; grid members between said burners and the bread carrying rack adapted to be heated to incandescence by said burners; and automatic means for removing said rack from between said burners.

2. A device such as described comprising a pair of spaced burners; a bread carrying rack adapted to be arranged between said burners; grid members between said burners and the bread carrying rack adapted to be heated to incandescence by said burners; and mechanism for removing said rack from between said burners after a predetermined period of time.

3. A device such as described comprising a pair of spaced heaters; a bread carrying rack adapted to be removably interposed between said heaters; grid members between said heaters and bread carrying rack adapted to be heated to incandescence by said heaters; locking means for holding said rack between said heaters and a mechanism for releasing said locking means and permitting a removal of said rack after a predetermined period of time.

4. A device such as described comprising a pair of spaced heating elements; grid members between said heaters and bread carrying rack adapted to be heated to incandescence by said heaters; a rack pivoted adjacent said elements and adapted to be arranged between said heating elements; a locking means for holding said rack between said elements and a spring for removing said rack from between said heating elements upon releasing said locking means.

5. A device such as described comprising a pair of spaced heating elements; grid members between said heaters and bread carrying rack adapted to be heated to incandescence by said heaters; a rack pivoted adjacent said elements and adapted to be arranged therebetween; a locking means for holding said rack between said elements; an automatic timing means for releasing said locking means from said rack and counterbalance means for removing said rack from between said heating elements.

In testimony whereof, I have hereunto set my hand at San Francisco, California, this 20th day of June, 1922.

HOWARD S. MURRAY.

In presence of—
LINCOLN V. JOHNSON.